(12) United States Patent
Duo et al.

(10) Patent No.: US 11,638,149 B2
(45) Date of Patent: Apr. 25, 2023

(54) INSTANT SECURE WIRELESS NETWORK SETUP

(71) Applicant: SonicWALL Inc., Milpitas, CA (US)

(72) Inventors: Zhuangzhi Duo, Fremont, CA (US); Atul Dhablania, San Jose, CA (US)

(73) Assignee: SonicWALL Inc., Milpitas, CA (US)

( * ) Notice: Subject to any disclaimer, the term of this patent is extended or adjusted under 35 U.S.C. 154(b) by 118 days.

(21) Appl. No.: 17/223,526

(22) Filed: Apr. 6, 2021

(65) Prior Publication Data

US 2021/0227391 A1    Jul. 22, 2021

Related U.S. Application Data

(63) Continuation of application No. 16/397,935, filed on Apr. 29, 2019, now Pat. No. 10,972,916.

(51) Int. Cl.
*H04W 12/08* (2021.01)
*H04W 80/10* (2009.01)
(Continued)

(52) U.S. Cl.
CPC ......... *H04W 12/08* (2013.01); *H04L 63/0807* (2013.01); *H04W 12/06* (2013.01);
(Continued)

(58) Field of Classification Search
CPC ..... H04W 12/08; H04W 12/50; H04W 12/69; H04W 12/72; H04W 12/73; H04W 12/75;
(Continued)

(56) References Cited

U.S. PATENT DOCUMENTS

| 7,215,926 B2 | 5/2007 | Corbett et al. |
| 7,576,646 B2 | 8/2009 | Hayden et al. |

(Continued)

FOREIGN PATENT DOCUMENTS

| KR | 2016-0091624 | 8/2016 |
| KR | 2018-0094985 | 8/2018 |
| WO | WO 2017/053048 | 3/2017 |

OTHER PUBLICATIONS

Bontu, Chandra S., Peryalwar, Shalini, and Pecen, Mark; "Wireless Wide-Area Networks for Internet of Things", IEEE Vehicular Technology Magazine, IEEE Xplore, Published Jan. 31, 2014, 10 pages.

(Continued)

*Primary Examiner* — Wayne H Cai
(74) *Attorney, Agent, or Firm* — Polsinelli LLP (57) ABSTRACT

The present disclosure relates to securely setting up mesh networks in a manner that does not require a physical network cable being attached to a wireless mesh device and that does not require transmitting unencrypted information wirelessly when a mesh network is setup. Methods and apparatus consistent with the present disclosure may allow a user to choose which mesh nodes can join a network and that user may specificity a custom profile that may include rules that may identify how mesh network identifiers are used, that identify passcodes/passphrases assigned to a particular network, may identify types of traffic that may be passed through particular 802.11 radio channels, or other parameters that may control how traffic is switched between devices in a particular wireless mesh network. This combined with dual factor verification and the use of different types of communication channels make wireless mesh networks easy to deploy and expand.

20 Claims, 7 Drawing Sheets

(51) Int. Cl.
*H04W 60/00* (2009.01)
*H04W 12/06* (2021.01)
*H04L 9/40* (2022.01)
*H04W 84/18* (2009.01)

(52) U.S. Cl.
CPC .......... *H04W 60/00* (2013.01); *H04W 80/10* (2013.01); *H04W 84/18* (2013.01)

(58) Field of Classification Search
CPC ... H04W 12/04; H04W 12/06; H04W 12/041; H04W 12/0431; H04W 12/0433; H04W 12/0471; H04W 60/00; H04W 80/10; H04W 84/18; H04L 9/0822; H04L 9/0825; H04L 63/0807
See application file for complete search history.

(56) References Cited

U.S. PATENT DOCUMENTS

| | | |
|---|---|---|
| 8,189,608 B2 | 5/2012 | Duo et al. |
| 9,407,624 B1 | 8/2016 | Myers et al. |
| 9,521,145 B2 | 12/2016 | Bhatt et al. |
| 9,955,526 B1 | 4/2018 | Yu |
| 10,057,227 B1 | 8/2018 | Hess et al. |
| 10,382,203 B1 | 8/2019 | Loladiae et al. |
| 10,764,128 B2 | 9/2020 | Kozura et al. |
| 10,972,916 B2 | 4/2021 | Duo |
| 2007/0070943 A1 | 3/2007 | Livet et al. |
| 2007/0275701 A1 | 11/2007 | Jonker |
| 2008/0063204 A1 | 3/2008 | Braskich et al. |
| 2009/0307343 A1 | 12/2009 | Kumagai |
| 2010/0122330 A1 | 5/2010 | McMillan et al. |
| 2011/0138183 A1 | 6/2011 | Reddy et al. |
| 2013/0318343 A1 | 11/2013 | Bjarnason et al. |
| 2014/0071837 A1 | 3/2014 | Werb et al. |
| 2014/0115673 A1 | 4/2014 | Haynes et al. |
| 2015/0180842 A1 | 6/2015 | Panther |
| 2015/0244706 A1 | 8/2015 | Grajek et al. |
| 2015/0372875 A1 | 12/2015 | Turon et al. |
| 2016/0037573 A1 | 2/2016 | Ko et al. |
| 2016/0134932 A1 | 5/2016 | Karp et al. |
| 2016/0219039 A1 | 7/2016 | Houthooft et al. |
| 2016/0294828 A1 | 10/2016 | Zakaria |
| 2016/0295364 A1 | 10/2016 | Zakaria |
| 2016/0349127 A1 | 12/2016 | Britt |
| 2016/0352729 A1 | 12/2016 | Malik |
| 2017/0006643 A1 | 1/2017 | Zakaria et al. |
| 2017/0171747 A1 | 6/2017 | Britt et al. |
| 2017/0346836 A1 | 11/2017 | Holland et al. |
| 2017/0347264 A1 | 11/2017 | Holland et al. |
| 2017/0359417 A1 | 12/2017 | Chen et al. |
| 2018/0007140 A1 | 1/2018 | Brickell et al. |
| 2018/0019929 A1 | 1/2018 | Chen et al. |
| 2018/0063714 A1 | 3/2018 | Stephenson |
| 2018/0091506 A1 | 3/2018 | Chow et al. |
| 2018/0124039 A1 | 5/2018 | Grajek et al. |
| 2018/0189507 A1 | 7/2018 | Wakai |
| 2018/0262497 A1 | 9/2018 | Raje et al. |
| 2018/0270904 A1 | 9/2018 | Swengler |
| 2018/0314808 A1 | 11/2018 | Casey et al. |
| 2018/0317266 A1 | 11/2018 | Britt et al. |
| 2019/0028467 A1 | 1/2019 | Oberheide et al. |
| 2019/0087568 A1 | 3/2019 | Kim et al. |
| 2019/0150134 A1 | 5/2019 | Kakinada et al. |
| 2019/0245713 A1 | 8/2019 | Lo et al. |
| 2019/0259260 A1 | 8/2019 | Amini et al. |
| 2019/0350021 A1 | 11/2019 | Blum |
| 2019/0357023 A1 | 11/2019 | Park |
| 2019/0386981 A1 | 12/2019 | Ramesh Kumar et al. |
| 2020/0007607 A1 | 1/2020 | Maxilom et al. |
| 2020/0044851 A1* | 2/2020 | Everson ............... G06Q 20/401 |
| 2020/0068483 A1 | 2/2020 | Likar et al. |
| 2020/0092701 A1 | 3/2020 | Arnberg et al. |
| 2020/0099896 A1 | 3/2020 | Galvin et al. |
| 2020/0169460 A1 | 5/2020 | Bartlett et al. |
| 2020/0169549 A1 | 5/2020 | Smith |
| 2020/0186998 A1 | 6/2020 | Smith et al. |
| 2020/0336476 A1* | 10/2020 | Polese Cossio ...... H04L 63/107 |
| 2020/0344599 A1 | 10/2020 | Duo |
| 2020/0359349 A1 | 11/2020 | Duo |
| 2020/0396613 A1 | 12/2020 | Duo |
| 2021/0056179 A1 | 2/2021 | Hiratsuka |

OTHER PUBLICATIONS

Khudoyberdiev et al., Azimbek; "A Novel Approach towards Resource Auto-Registration and Discovery of Embedded Systems Based on DNS", Electronics, Published Apr. 17, 2019.
U.S. Appl. No. 16/404,655 Office Action dated Sep. 1, 2021.
U.S. Appl. No. 16/404,655 Office Action dated Jul. 27, 2022.
U.S. Appl. No. 16/883,275 Final Office Action dated Jul. 7, 2022.
U.S. Appl. No. 16/911,111 Office Action dated Aug. 3, 2022.
U.S. Appl. No. 16/883,275 Office Action dated Nov. 26, 2021.
Akyildiz et al., Ian F., Wang, Xudong, Wang, Weilan, "Wireless mesh networks: a survey", Science Direct, Computer Networks Jan. 1, 2005.
"Building a Rurul Wireless Mesh Network" by David Johnson, Karel Matthee, Dare Sokoya, Lawrence Mboweni, Ajay Makan, and Heng Kotze, pp. 44; Oct. 30, 2007.
"Cognitive Wireless Mesh Networks with Dynamic Spectrum Access", by Kaushik R. Chowdhury, Student Member, IEEE, and Ian F. Akyildiz, Fellow, IEEE. IEEE Journal on Selected Areas in Communications, vol. 26, No. 1, Jan. 2008, pp. 14.
U.S. Appl. No. 16/397,935 Office Action dated Jul. 2, 2020.
U.S. Appl. No. 16/404,655 Final Office Action dated Apr. 8, 2021.
U.S. Appl. No. 16/404,655 Office Action dated Jan. 15, 2021.
Al-Fairuz et al., Mohamed, "Multi-channel, Multi-level Authentication for More Secure eBanking" pp. 8; Jul. 3, 2017.
Renaud et al., Karen "A Support Architecture for Multichannel, Multifactor Authentication" pp. 9; Apr. 2, 2014.
Willeke, Jim; "Multiple-channel Authentication", pp. 2, revised on Jul. 3, 2017.
U.S. Appl. No. 16/404,655 Final Office Action dated Apr. 8, 2022.
U.S. Appl. No. 16/404,655 Final Office Action dated Dec. 19, 2022.

* cited by examiner

INSTANT SECURE WIRELESS NETWORK SETUP

CROSS-REFERENCE TO RELATED APPLICATIONS

The present application is a continuation and claims the priority benefit of U.S. patent application Ser. No. 16/397,935 filed Apr. 29, 2019, now U.S. Pat. No. 10,972,916, the disclosure of which is incorporated herein by reference.

BACKGROUND OF THE INVENTION

Field of Invention

The present disclosure generally relates to configuring a wireless network. More specifically, the present disclosure relates to increasing the efficiency of setting up a wireless network.

Description of the Related Art

Every day the use of wireless networks is expanding. Furthermore, various different vendors provide redundant wireless links that allow wireless data communications to be switched between different pieces of computer hardware as needed. Communications may initially be passed via a first wireless access point and those communications may switch to being passed via a second wireless access point when the first wireless access point fails or when that first wireless access point becomes heavily loaded. In other instances, communications may be switched from the first to the second wireless access point when a mobile device is moved from one place to another. Wireless mesh networks predominantly use communications consistent with one of the 802.11 (or "Wi-Fi") wireless communication standards. Because of this, 802.11 communication channels are a preferred type of communication channel used in wireless mesh networks.

Today, a number of wireless access points or nodes in a wireless network may vary significantly. For example, a first wireless network may include two wireless access points and a second wireless network may include dozens of wireless access points. Wireless networks configured to switch communication traffic between different wireless access points are commonly referred to as wireless mesh networks, where individual access points may be referred to as mesh nodes, mesh points, or mesh portals. The ability for switching communication traffic allows hubs, routers, or switches included in conventional wired networks to be bypassed as each individual mesh node may perform functions consistent with a legacy hub, router, or switch.

Processes for setting up and configuring a wireless mesh network are often time consuming, inefficient, error prone, insecure, or are not scale-able. In certain instances, once a wireless mesh network is setup, adding additional wireless access points to that network may not be possible, in other instances adding additional wireless access points may require an administrator to manually configure new mesh nodes using tedious processes.

One process for setting up wireless access points relies on initially connecting a network cable (such as an Ethernet cable) to each respective access point as each of those respective access points are configured in a serial fashion. Such a serial setup methodology does not scale well as the setting up of 10 mesh nodes takes 10 times longer than setting up a single mesh node.

A second process that may be employed to setup wireless mesh networks is to configure a fixed number of wireless access points when those access points are manufactured. Once this fixed number of access points are factory configured to securely communicate with each other, they can be installed and operate in a configuration that may not be expandable. While this second process has the advantage of easy secure installation, it suffers with scale-ability limitations. As such, this second configuration process may be appropriate for smaller mesh networks where there may be no need for the size of that mesh network to increase over time.

A third process that may be used to setup a wireless mesh network is by using non-secure wireless data communications to initially configure wireless access points. While this third process may provide the ability for a wireless mesh network to be expanded, every time a wireless access point is initially configured, data being communicated wirelessly during that configuration process may be observed or exploited by individuals with nefarious intent. This provides a window of vulnerability that exposes a network to being attacked. For example, a hacker could pretend to be a new access point or could pretend to be a device attempting to connect to the wireless network using information that was observed (snooped) by the hacker during the window of vulnerability.

In certain instances, vendors that provide mesh device rely on the use of onboarding service web portal to setup a wireless mesh network. Such instances may require that a user can login and manually input the access point device serial numbers to complete the registration process. This manual process is error-prone and requires users to spend a large amount of time collecting device information and entering that information into a web portal one by one. This is a lengthy process that is very tedious, especially when a large wireless network is configured. In other instances, other products may be installed using a batch processing solution that may help reduce manual effort to some extent, yet even such batch processing methods still require a person to enter data manually as part of the configuration process. An example of a batch process is where a user enters data into an Excel spreadsheet that is later used with a software program that accesses the spreadsheet during the network setup process. Such batch processing techniques, however still requires error-prone manual data entry and additional effort may be required to maintain the excel spreadsheet over time.

Since, current wireless access points are not designed to easily be installed, provisioned with software, or configured in a secure way, what are needed are new ways of securely installing, provisioning, and configuring wireless access points and other devices that communicate with a wireless mesh network.

SUMMARY OF THE CLAIMED INVENTION

The presently claimed invention relates to a method, a non-transitory computer readable storage medium, and an apparatus executing functions consistent with the present disclosure for setting up wireless mesh network devices. A method consistent with the present disclosure may include organizing information associated with a set of wireless devices and that generates a profile for configuring the set of wireless devices into a new wireless mesh network. The profile may have been generated according to inputs received by a computing device. After the profile has been generated, registration information may be sent to another computer. This registration information may identify the computing device and each individual wireless device of the set of wireless devices. After the registration information is received by the other computer, a message may be received from the computer that indicates that the new mesh network has been registered as a registered mesh network.

When the method of the presently claimed invention is implemented as a non-transitory computer readable storage medium, a processor executing instructions out of a memory may implement a method consistent with the present disclosure. Here again this method may include organizing information associated with a set of wireless devices and that generates a profile for configuring the set of wireless devices into a new wireless mesh network. The profile may have been generated according to inputs received by the processor at a computing device. After the profile has been generated, registration information may be sent to another computer. This registration information may identify the computing device and each individual wireless device of the set of wireless devices. After the registration information is received by the other computer, a message may be received from the computer that indicates that the new mesh network has been registered as a registered mesh network.

An apparatus consistent with the present disclosure may include a memory and a processor that executes instructions out of the memory to implement methods consistent with the present disclosure. Here again this method may include organizing information associated with a set of wireless devices and that generates a profile for configuring the set of wireless devices into a new wireless mesh network. The profile may have been generated according to received inputs. After the profile has been generated, registration information may be sent to a computer that stores mesh network registration information. This registration information may include an identifier that identifies a computer that is associated with the processor and may include information that identifies each individual wireless device of the set of wireless devices. After the registration information is received by the computer, a message may be received from the computer that indicates that the new mesh network has been registered as a registered mesh network.

DETAILED DESCRIPTION

The present disclosure relates to securely setting up mesh networks in a manner that does not require a physical network cable being attached to a wireless mesh device and that does not require transmitting unencrypted information wirelessly when a mesh network is setup. Methods and apparatus consistent with the present disclosure may allow a user to choose which mesh nodes can join a network and that user may specificity a custom profile that may include rules that may identify how mesh network identifiers (IDs) are used, that identify passcodes/passphrases assigned to a particular network, may identify types of traffic that may be passed through particular 802.11 radio channels, or other parameters that may control how traffic is switched between devices in a particular wireless mesh network. This combined with dual factor verification and the use of different types of communication channels make wireless mesh networks easy to deploy and expand according to the wishes of users that are responsible for establishing and maintaining specific wireless mesh networks.

Figure 1:
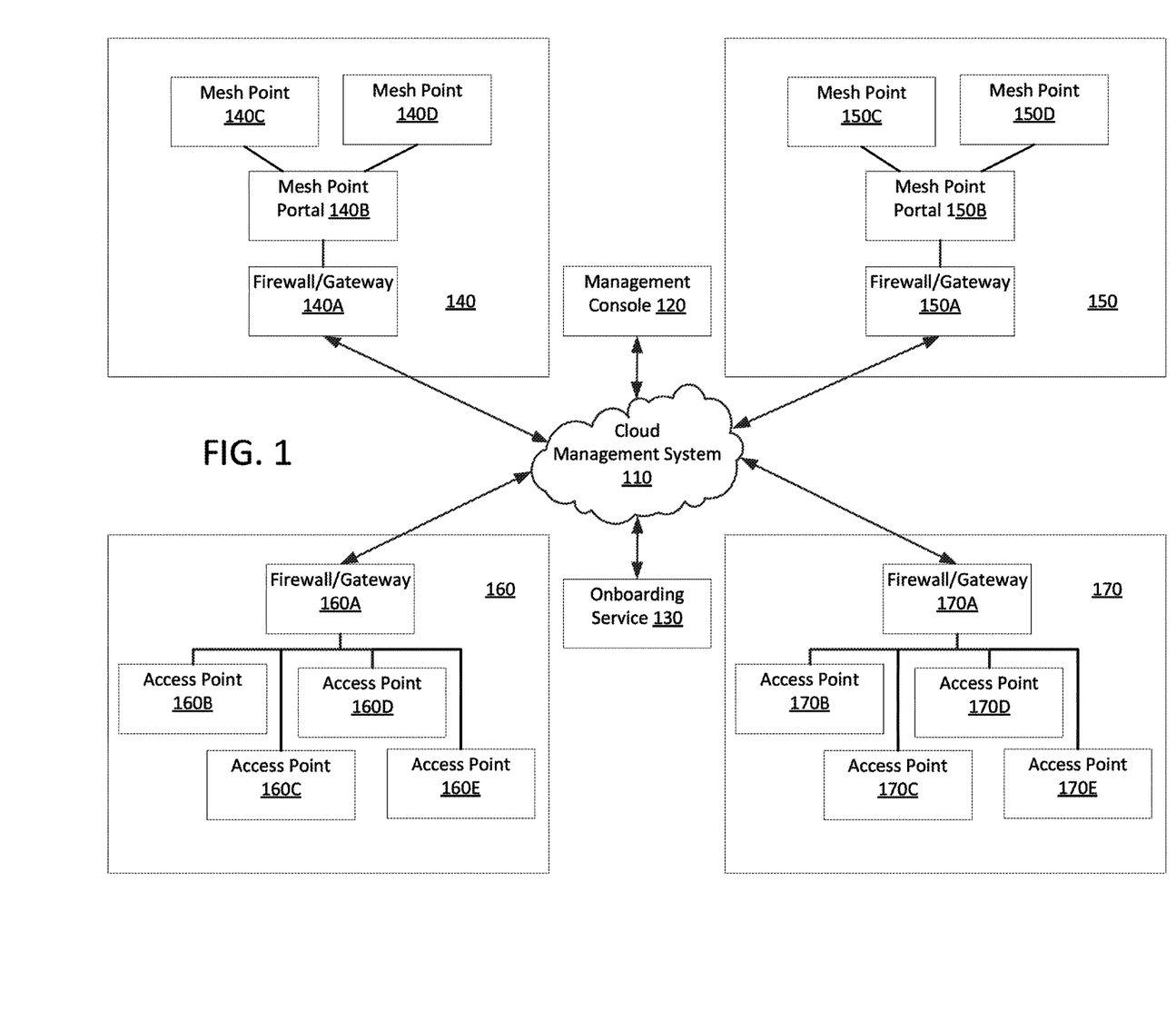
FIG. 1 illustrates a system that may be used to efficiently configure computing devices at a wireless mesh network.

FIG. 1 illustrates a system that may be used to efficiently configure computing devices at a wireless mesh network. FIG. 1 includes a management system 110 that may reside in a cloud computing environment. Management system 110 may be accessed via any type of computer network known in the art, wired or wireless. FIG. 1 includes management console 120 and onboarding service 130 that may be part of management system 110. FIG. 1 also includes various sets of networked computing devices 140, 150, 160, and 170. A first set of networked computing device 140 includes firewall/gateway 140A, mesh portal 140B, and mesh points 140C & 140D. A second set of networked computing device 150 includes firewall/gateway 150A, mesh portal 150B, and mesh points 150C & 150D. A third set of networked computing device 160 includes firewall/gateway 160A and access points 160B, 160C, 160D & 160E (160B-160E). A fourth set of networked computing device 170 includes firewall/gateway 170A and access points 170B, 170C, 170D & 170E (170B-170E).

In certain instances mesh portals consistent with the present disclosure may wirelessly communicate with a plurality of wireless mesh points and may communicate over a wired network. As such, a mesh portal may be act as a gateway between wireless mesh points and a wired local area network, for example. In such instances a mesh portal may broadcast transmissions that include a mesh identifier (MSSID) and a cluster name that advertise the wireless network to mesh points that are configured to operate as members of a particular wireless mesh network. In other instances, a mesh point may include a cellular (e.g. 3G, 4G, LTE, or 5G) link or more than one mesh node in a mesh network may be configured to operate as a redundant mesh point that uses a wired or a wireless network connection.

The terms "access point" or "wireless access point" in the present disclosure refer to a device that may be wirelessly communicatively coupled to a computer directly without wireless communications passing through another wireless device. As such, the terms "access point" or "wireless access point" may refer to either a mesh portal or mesh point, the terms mesh portal relates to a wireless device that performs functions that a mesh point need not perform. Both mesh portals and a mesh points may perform functions consistent with a wireless access point because both mesh portals and mesh points may act as a wireless access point that directly wirelessly communicates with a computer in just a single hop, without wireless communications passing through another wireless device. The terms mesh node in the present disclosure may be used to refer to either a mesh portal or a mesh point that uses wireless communications to transmit and receive wireless computer network messages and data.

Typically the terms "firewall" or "gateway" in the present disclosure refer to computing devices that communicate over wired network connections. In certain instances, however, a mesh node may include functionality consistent with a firewall or gateway. In certain instances, functions conventionally associated with a firewall or gateway may be performed by a mesh portal or by mesh point. In these instances, a mesh portal or a mesh point may perform functions consistent with evaluating content ratings, deep packet inspection, or may include anti-virus program code.

A mesh portal will transmit and receive data network communication traffic between two different types of computer network, for example, between a network that communicates over wires and a network that uses wireless 802.11 signals. Alternatively or additionally, a mesh portal may transmit and receive data network communication traffic between a cellular network and an 802.11 network. Mesh points, however, may be limited to receiving and transmitting network traffic wirelessly over a single type of network, for example, over an 802.11 network. While mesh portals include different functionality as compared to a mesh point, certain mesh points may be configured to assume the role of a mesh portal.

Once configured, mesh points consistent with the present disclosure may communicate using wireless 802.11 communications only, or some of these mesh points may be configurable to be promoted to assume the functionality of a wireless mesh portal. While communications in a mesh network may be sent through any number of mesh points until those communications reach a mesh portal, most mesh points may typically be located within three hops of a mesh portal. Furthermore, a number of mesh portals that communicate with a mesh point may be limited by a setting.

For example, a rule may limit a number of mesh portals connected to a particular mesh portal to eight or another rule may limit a number of hops to three.

The mesh point portals (140B & 150B), mesh points (140 C/D & 150 C/D) of FIG. 1 may be wireless mesh nodes that allow mobile devices or other computers to connect to networks 140 or 150 redundantly. For example, a user device may initially connect to network 140 using mesh point 140C after which communications may be sent to mesh point 140D. In an instance, when mesh point 140C is unreliable, fails, is overloaded, or when a signal strength of mesh point 140C is weaker than the signal strength of mesh point 140D, communication traffic may be switched from mesh point 140C to mesh point 140D. In certain instances, the mesh points illustrated in FIG. 1 may include similar functionality as functionality performed by a mesh portal. Mesh point portals may include additional functionality that may not be provided by a mesh point in a given network. For example, mesh point portal 140B may be able to send transmissions over a wired network to firewall/gateway 140A. Alternatively or additionally, mesh point portals may be configured to communicate with other computing devices wirelessly. In such instances, mesh point portal 140A may communicate with cloud management system or with other devices via a cellular network, while mesh point portal communicates with other devices (such as user devices, mesh point 140C, or mesh point 140D) using standard 802.11 wireless communications. Computing devices associated with networks 160 or 170 include firewall/gateway (160A & 170A) and various access points (160B-160E & 170B-170E). In certain instances, each of these different access points may include wireless communication capabilities like the mesh points 140C/140D and mesh portal 140B of network 140, for example.

Computing devices connecting to a particular mesh network and mesh nodes (mesh points or mesh portals) may be setup and configured using methods that increase security by using shared secrets or that use privileged communication pathways. These shared secrets or privileged communication pathways may be difficult or impossible to observe (snoop) or hack. For example, a particular computing device may be configured to communicate with cloud management system 110 of FIG. 1 via a secure tunnel during a configuration process that also uses a different communication technique to share information between a mesh point and a user device. In such an instance, this different communication technique may include sending information between the mesh point and the user device via a short distance/low power communication connection, such as a Bluetooth or Bluetooth light communication connection. Data transmitted via this low power communication connection could be difficult to snoop or hack in instances when a hacker is physically located out of range of a low power data communication signal.

Processes for configuring and setting up devices in a wireless mesh network may also include two factor authentications, where secret information is sent to a user device. For example, a message that includes secret information may be sent to an email address or may be sent in the form of a text message to the user device. This secret information may then be used to secretly validate or identify that the computing device can be allowed access communicate with devices at a wireless mesh network. For example, a user device may provide a secret code that was received via a text message from a computer located at the cloud or Internet to a wireless access point.

Once validated, a user device may be able to connect to a particular mesh network from anywhere. For example, a configuration at a validated user device may allow that user device to connect to the mesh network via a cellular connection when that user device is located at a location far from an 802.11 mesh network. In such an instance, the user device may communicate with other devices that are located within a zone, where these other devices may communicate via the mesh network using communications consistent with an 801.22 WI-FI communication channel.

When a mesh network is configured, communications may pass from one or more mesh nodes (mesh point or mesh portals) as those mesh nodes are provisioned with software or configured using onboarding service 130 of FIG. 1. Management consoles 120 may be used to organize and store data associated with particular mesh networks in a database. Data stored in such a database may cross-reference customer identifying information with machine (MAC) addresses that identify mesh node devices that have been configured to operate in that particular customer's wireless mesh network. Data stored in this database may also cross-reference MAC addresses or other information that identifies computing devices that are authorized to connect to a particular customer's wireless mesh network. In certain instances, MAC addresses or other identifying information stored in the database may be copied to memories resident within a particular mesh network. After sets of configuration information are stored, additional mesh nodes may be added to the mesh network in a manner that requires little user intervention. For example, a user device may scan a label, a bar code, a quick response (QR) code, or a near field data communication (NFC) tag/chip that identifies the new mesh node component. Once that new mesh node component has been identified and cross-referenced to a particular customer account, that new component may be provisioned with software and configured automatically. Here again, low power data communications may allow an authorized user device to securely configure a single or a group of wireless access points. Methods and systems consistent with the present disclosure provide a capability that allows all communications of a wireless mesh network to be secure, even when networks are initially configured or when new wireless access points are added to a wireless mesh network.

Whenever mesh nodes in a mesh network are powered on (boot up) they may communicate with each other when identifying best pathways that can be used to pass network communications. In certain instances, different frequencies may be used to transmit 802.11 communications and these frequencies may be configured by one or more rules that direct certain types of communication traffic to a particular radio frequency. For example, communications that use 5 gigahertz (GHz) signals may be used to transfer network associated data and client traffic and communications that use 2.4 GHz signals may be used only for client data. Furthermore, each mesh node (mesh point or mesh portal) may be configured and provisioned according to a consistent profile according to one or more rules.

Figure 2:
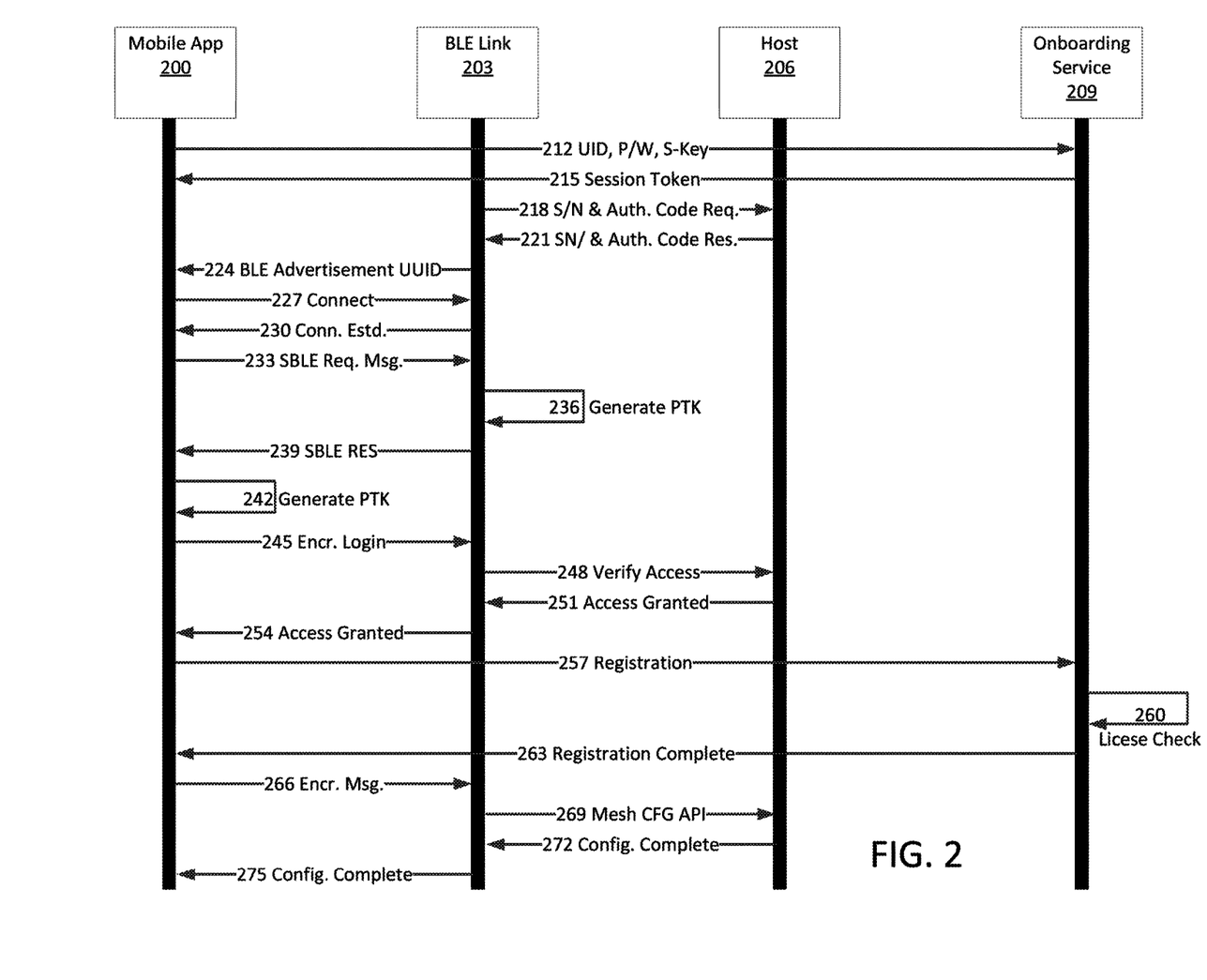
FIG. 2 illustrates communications that may be performed when a computing device is registered and configured to communicate with a mesh network.

FIG. 2 illustrates communications that may be performed when a computing device is registered and configured to communicate with a mesh network. FIG. 2 includes actions performed by a mobile device that may communicate with a host computer 206 via a short distance wireless link (such as a Bluetooth or low power Bluetooth communication link) 203. At least a portion of a process that registers mobile app 200 may be performed via operation of program code on onboarding service 209. Program code instructions associated with onboarding service 209 may be executed by a processor at a cloud computing device and program code residing at the mobile device may include instructions associated with mobile app 200.

Initially, program code of mobile APP 200 may prepare a message 212 to send to an onboarding service in the cloud. This communication may be passed by any communication medium known in the art, yet for convenience, in certain instances, message 212 may be sent via a wireless cellular communication link. Message 212 will typically be sent via a secure communication protocol, such as the secure hypertext transfer protocol (HTTPS). By using a secure communication protocol information may be securely provided to a cloud computer that executes program code consistent with onboarding service 209. In certain instances, message 212 may be passed through host 206. Alternatively, message 212 may be passed directly to the computer executing the instructions of onboarding service 209 without passing through host 206. Message 212 may include a user identifier (UID), a password, and a security key. After the login information has been sent to onboarding service 209, the computer executing the onboarding service 209 program code may include instructions that cause a unique session token to be sent to a mobile device executing instructions associated with mobile APP 200. Program code associated with onboarding service 209 may also use a two-factor authentication process to validate a user device before issuing a session token. For example, a cloud computing device may send a text message, email, or voice message that includes a code that must be provided to the cloud computer before a session token is sent to a mobile device in communication 215 of FIG. 2.

In certain instances, BLE link 203 may be coupled to a first processor at a wireless access point that communicates with a second processor at host 206. Because of this the first processor at the wireless access point may perform tasks associated with messages or processes 218, 221, 224, 227, 230, 233, 236, 239, 245, 248, 251, 266, 269, 272, and 275 and the second processor at the wireless access point may perform tasks associated with messages or processes 218, 221, 248, 251, 269, and 272. In other instances, other low power data communication technologies may be used in when a wireless mesh network is setup. For example, a proprietary wireless communication technique may be used or a high bandwidth short distance millimeter radio wave transducers (such as transducers made by Keyssa (e.g. the "Keyssa Kiss") or optical data transmitters/receivers/transceivers may be used.

A person configuring their wireless mesh network may then use their mobile device to scan a barcode, a quick response (QR) code, or a near field data communication (NFC) tag to obtain information associated with host 206. After the mobile user device has scanned code or tag, authentication information may be sent via short distance wireless link 203 to host 206 in communication 218 of FIG. 2 and then a response to that authentication request may be received in communication 221 of FIG. 2. Authentication request 218 may include a serial number of host computer 206 and may include an authentication code. Authentication request 218 may be sent by circuitry, a chip, or a processor that communicates with a mobile device using Bluetooth communications (BLE) link 203 and that communicates with a processor of host computer 206. Communication 221 is a response message that may pass the serial number of host computer 206 and the authentication code from the processor of host 206 back to the circuitry, the chip, or the processor of BLE link 203. Since communications sent via wireless link 203 are low power wireless signals, only devices within a particular distance of host 206 would be able to receive information sent via low power wireless link 203. As such, the use of low power wireless link 203 allows devices to initiate a relatively secure registration process using communications that have a very limited range.

Host computer 206 may then broadcast advertisement messages to devices within range of the low power link 203. This advertisement may be in a format consistent with a low power Bluetooth advertisement that may include an encoded universal unit identifier (UUID) and this encrypted UUID may include an authorization code, a system status, and a serial number, for example. The mobile APP 200 at a mobile device may then compose a connect message 227 that is sent to host computer 203 via link 203, and a Bluetooth connection message 230 may then be sent to the mobile device when a secure low power/Bluetooth communication session is established between the host 206 and the mobile device. After the low power communication session has been established, mobile APP may then generate request message 233 to send to the host 206 of FIG. 2. This request message may include a first random/pseudo random number (or first nonce). Next, a process at the host 206 may generate a second random/pseudo random number (or second nonce) and may generate a pairwise temporary key (PTK) during process 236 of FIG. 2. This temporary key may have been generated using the first nonce, the second nonce, a machine (MAC) address of the mobile device, a MAC address of host 206, a serial number, or other information. This temporary key may also be created using a hash of information. The MAC address of the mobile device may have been provided to host 206 in connect message 227 of FIG. 2.

Host 206 may then generate message 239 that includes a machine integrity code (MIC) and the second nonce. After message 239 is generated it may be sent to the mobile device. Next, mobile APP 200 may then extract the MIC and the second nonce from message 239 and then a processor at the mobile device may generate the pairwise temporary key using information that may include the first nonce, the second nonce, the mobile device MAC, the host MAC, the serial number, the authentication code, or other information in process 242 of FIG. 2. The processor at the mobile device may then compute its own version of the MIC and compare that re-computed MIC with the MIC included in message 239 when verifying the pairwise temporary key during process 242 of FIG. 2. The processor at the mobile device may then encrypt a login message that is sent to host 206 over link 203. This encrypted login message may include a user name, a password, and an authentication code. Host 206 may then verify this login information during process 248 of FIG. 2, host 206 may then prepare an access granted message during process 251 that is sent to the mobile device as access granted message 254 of FIG. 2. Next, the mobile device may then send registration message 257 to the cloud computer that executes instructions consistent with onboarding service 209. Here again message 257 may be sent over the secure tunnel to the cloud computer. Registration message 257 may include a user identifier (UID), the session token from message 215, a serial number, and an authentication code. Registration message 257 may also include settings set by a user accessing mobile APP 200 at a mobile or other computing device.

The cloud computer executing the instructions consistent with onboarding service 209 may then validate the mobile device during process 260 that may check that the user device is associated with a valid license or valid customer account. In certain instances, the cloud computer may store information that associates host 206 and the user device MAC with a particular wireless mesh network and with a particular customer. After the mobile device is authenticated, onboarding service 209 may then prepare a message to send to the mobile device and the cloud computer may then send a registration complete message 263 to the mobile device.

After receiving the registration complete message, the mobile application 200 at the mobile device may then send an encrypted message 266 via wireless link 203. This encrypted message may include an encrypted version of the pairwise temporary key that was calculated during process 242 of FIG. 2. After encrypted message 266 is sent, that message may be decrypted according to an encryption standard using the pairwise temporary key generated at host 206 during process 236 of FIG. 2. This decryption may be performed during process 269 of FIG. 2. This decryption may be performed using an application program interface (API) call that may be referred to as a mesh configuration API call. Process 269 may also include setting a configuration after which process 272 may compose a configuration complete message 275 to send to the mobile device.

After completing this configuration process, the mobile device executing program code consistent with mobile APP 200 may securely communicate with computing devices at the Internet via one or more different mesh nodes devices included in the newly configured mesh network. Host 206 may be a mesh point or a mesh point portal like those illustrated in FIG. 1. Operation of mobile APP 200 may allow a mobile device to find and identify all compatible mesh points or mesh portals that are associated with a mesh network. In certain instances program code of mobile APP 200 may allow a mobile device to communicate with compatible mesh nodes (mesh points or portals) when multiple mesh nodes are registered, provisioned with software, or configured simultaneously.

Methods and apparatus consistent with the present disclosure may allow a user to choose which mesh nodes can join a network and that user may specificity a custom profile that may include rules that may identify how mesh network identifiers (IDs) are used, that identify passcodes/passphrases assigned to a particular network, may identify types of traffic that may be passed through particular 802.11 radio channels, or other parameters that may control how traffic is switched between devices in a particular wireless mesh network. This combined with dual factor verification and the use of low power wireless communication channels make methods and apparatus consistent with the present disclosure easy to deploy and expand according to the wishes of users that are responsible for establishing and maintaining specific wireless mesh networks. In certain instances, mesh IDs and passcodes/passphrases may be based on a timestamp or equipment identifiers that insure that a mesh ID or other information are unique. Methods consistent with the present disclosure may receive settings or profile information via operation of a program application, like mobile APP 200 of FIG. 2, for example.

Figure 3:
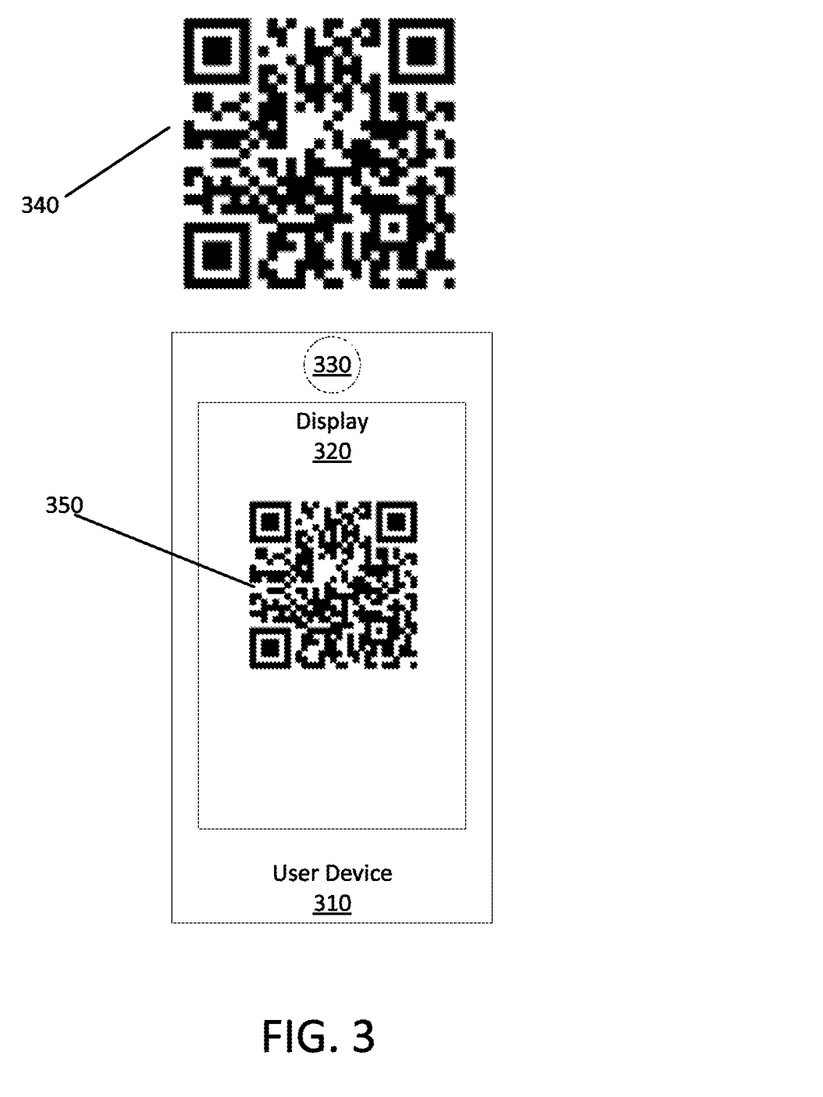
FIG. 3 illustrates a user device that acquires an image of a Quick Response (QR) code when configuring a wireless mesh network.

FIG. 3 illustrates a user device that acquires an image of a Quick Response (QR) code when configuring a wireless mesh network. FIG. 3 includes user device 310 that acquires an image of QR code 340 using camera/sensor 330 at user device 310. User device 310 also includes display 320 that displays an image 350 of QR code 340 after that image has been acquired. The QR code 340 illustrated in FIG. 3 may be a code imprinted on enclosure of a wireless access point (mesh node) or QR code 340 may be imprinted on a box that contained the wireless access point (mesh node).

Once the code is acquired, user device 310 may communicate with the wireless access point when a wireless mesh network is setup, provisioned, or configured. A program application executing at user device 310 may allow user device 310 to identify a serial number and authentication code associated with the wireless access point when sending communications to that wireless access point as illustrated in communications 218, 221, 224, 227, 230, and 233 of FIG. 2. Here again, these communications may use a low power communication interface that can only transmit signals within a limited range. As such, user device 330 may acquire an image of QR code 350 by scanner/camera 330 that may result in image 350 being acquired by user device 310 and displayed in display 320 of user device 310. Once this image data is processed by user device 310, user device 310 may perform steps consistent with FIG. 2 when setting up a wireless mesh network. In certain instances, information transmitted by another type of wireless communication interface may be used to send information directly from user device 310 or via the wireless access point when registration details are sent to a computer in the cloud or Internet. These registration details may be used to associate a customer identifier with devices in a configured wireless mesh network. Furthermore, these registration details may be used to identify that user device 310 is authorized to access the wireless mesh network of that customer, even when user device 310 previously did not communicate with particular devices of a wireless mesh network.

For example, user device 310 may have been used to configure mesh nodes at an office in San Francisco that is associated with customer A. In an instance, where a user of user device 310 travels to an office of customer A in Los Angeles, user device 310 may be identified as being authorized to access the wireless 802.11 network of customer A at their Los Angeles office. Alternatively or additionally, user device 310 could access other devices at the wireless mesh network via a cellular communication interface, when user device 310 was located away from either the San Francisco or the Los Angeles office of customer A.

During installation of a new wireless mesh network or when expanding a wireless mesh network, all nearby compatible wireless mesh devices may be identified along with respective capabilities of each respective wireless mesh device. In certain instances, a user may be able to select from a list of mesh devices identified using low power data communications when the mesh network is setup or expanded and each of the selected mesh devices may be configured according to a profile in a parallel rather than in a serial manner. The scanning capability illustrated in respect to FIG. 3 may be used to identify mesh devices that should be configured as part of a mesh network. A user may also select a size of the mesh network and may set a topology of a mesh network. For example, particular mesh points may be initially configured to communicate with certain other specific mesh points, where each mesh node may be placed in a hierarchy that specifies at least initial settings relating to which mesh point is located how many hops from a particular mesh portal. These mesh points may also be configured to switch configurations based on other settings or parameters by using a program application, such a mobile APP 200 of FIG. 2.

Figure 4:
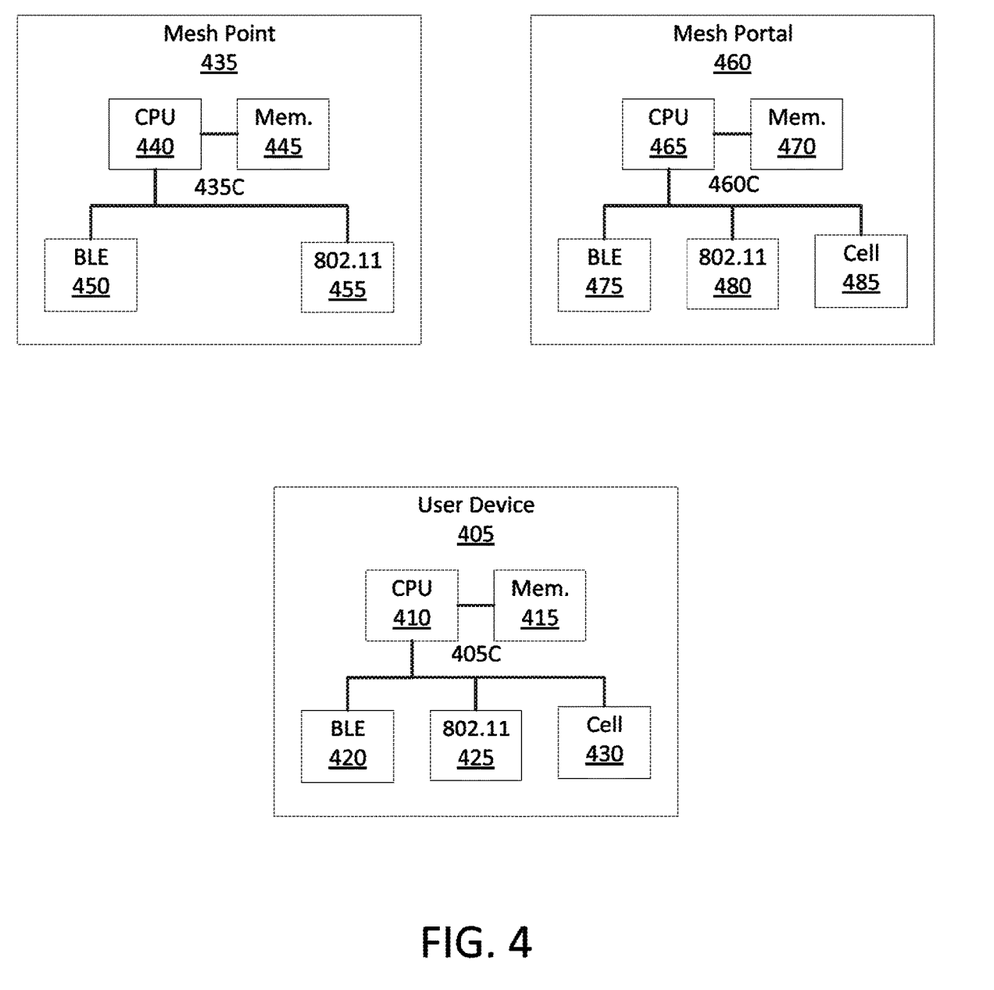
FIG. 4 illustrates different computing devices that may be configured to send communications with each other according to rules or policies consistent with the present disclosure when a wireless mesh network is setup.

FIG. 4 illustrates different computing devices that may be configured to send communications with each other according to rules or policies consistent with the present disclosure when a wireless mesh network is setup. FIG. 4 includes user device 405, mesh point 435, and mesh portal 460. User device 405 includes a processor/central processing unit (CPU) 410 that may execute instructions out of memory 415. User device 405 also includes communication interfaces of low power Bluetooth light interface 420, Wi-Fi 802.11 interface 425, and cellular interface 430. Items 405C included in user device 405 are electrical connections that CPU 410 may use to access memory 415 or that CPU 405 may use to communicate with Bluetooth light interface 420, Wi-Fi 802.11 interface 425, and cellular interface 430. Communication connections 405C may include direct electrical connections that form a communication bus. User device 405 may be the same mobile device that executes instructions consistent with functions associated with mobile app 200 of FIG. 2. As such, user device 405 may communicate with low power data communication links (475/450) at mesh portal 435 or mesh portal 460 using BLE links 203 of FIG. 2.

The mesh point 435 of FIG. 4 includes processor/CPU 440 that may execute instruction out of memory 445. Mesh point 435 also includes Bluetooth light interface 450 and Wi-Fi 801.22 interface 455. Items 435C are communication connections that CPU 440 may use to access memory 445 or that CPU 445 may use to communicate with low power Bluetooth light interface 450, and Wi-Fi 802.11 interface 455. Communication connections 435C may include direct electrical connections that form a communication bus. Mesh point 435 may implement functions consistent with the various mesh points (140C, 140D, 150C, or 150D) discussed in respect to FIG. 1. Furthermore, the low power communication link 450 at mesh point 435 may communicate in a manner consistent with the BLE link 203 of FIG. 2.

Mesh portal 460 includes processor/CPU 465 that may execute instruction out of memory 470. Mesh portal 460 also includes communication interfaces of low power Bluetooth light interface 475, Wi-Fi 802.11 interface 480, and cellular interface 485. Note that mesh portal 460 includes cellular communication interface 485, where mesh point 435 does not include a cellular communication interface. Items 460 are communication connections 460C that CPU 465 may use to access memory 470 or that CPU 465 may use to communicate with low power Bluetooth light interface 475, Wi-Fi 802.11 interface 480, and cellular interface 485. Communication connections 460C may include direct electrical connections that form a communication bus. Mesh portal 460 may implement functions consistent with the various mesh portals (140BC or 150B) discussed in respect to FIG. 1. Furthermore, the low power communication link 475 at mesh point 460 may communicate in a manner consistent with the BLE link 203 of FIG. 2.

Note that mesh portals and mesh points may include different capabilities as mesh portals may include functionality that allows the mesh portal to send network communications over cellular communication interface 485, where mesh point 435 may not include this functionality. In certain instances mesh portals may include wired network interfaces that allow a mesh portal, like mesh portal 460 to send network communications over a wired computer network, where mesh point 435 may not include such functionality.

Alternatively, mesh point 435 may include a cellular communication interface or a wired that is disabled based on a mesh point configuration that is different from a mesh portal configuration. In certain instances, user device 405 may communicate with both mesh point 435 and with mesh portal 460 using a low power signals that have a limited range. For example Bluetooth light interface 420 at mobile device 405 may communicate with mesh point 435 using Bluetooth light interface 450 and may communication with mesh point 460 via Bluetooth light interface 475 during a registration process. User device 405 may also communicate with mesh point 435 using 802.11 interface 425 at user device 405 and 802.11 interface 455 at mesh point 435. Alternatively or additionally, user device 405 may also communicate with mesh portal 460 using 802.11 interface 425 at user device 405 and 802.11 interface 480 at mesh portal 460.

In an instance where mesh point 435 fails when user device 405 is communicating with mesh point 435 over using communications consistent with the 802.11 specification, communications could "fail over" (switch) to mesh portal 460 or another mesh point (not illustrated in FIG. 4). Such a "fail over" process could include user device 405 forming a communication connection with either mesh portal 460 or with the other mesh point. Communications sent computer through a first mesh point may be switched to a second mesh point according to a set of rules that identify conditions when such communications should be switched. For example, a rule may identify that communications be switched to another mesh point when communications with a currently used mesh point is experiencing an error rate that meets or exceeds a threshold level. Alternatively or additionally, switching rules may identify that a communication connection should be switched when a collision rate increases, when a particular mesh point has a greater than a threshold level measure of congestion, or such rules may dictate that a particular connection should be switched when another mesh node has a greater signal strength. For example, a reduction in signal strength in communication associated with mesh point 435 may cause a communication connection to switch to another mesh point when that other mesh point has a stronger signal than mesh point 435. Exemplary measures of congestion include, yet are not limited to an amount of time or average time required to send or receive communication packets, a number of devices connected to a particular mesh point, or a number of hops to a mesh portal. This number of hops may be associated with a number of mesh points through which a data packet passes until that data packet reaches a mesh portal. The switching capability included in wireless mesh networks consistent with the present disclosure allows either indoor or outdoor wireless networks to self-heal in a manner that is redundant, robust, and secure. This switching capability also allows traffic in a wireless mesh network to be re-configured according to any rules or policies as requirements change over time.

In certain instances, methods and systems consistent with the present disclosure may include promoting a mesh point to assume functions of a mesh portal. This may occur when a particular mesh portal fails, when a greater than a threshold error rate is encountered, when an increased collision rate associated is observed, or when a measure of congestion associated with a mesh portal reaches a threshold level. The promotion of a mesh point to a mesh portal may include enabling functionality at a particular mesh point. For example, in an instance when mesh point 435 is promoted, a cellular communication interface at mesh point 435 may be turned on (enabled) such that mesh point 435 could assume duties previously performed by mesh portal 460.

Figure 5:
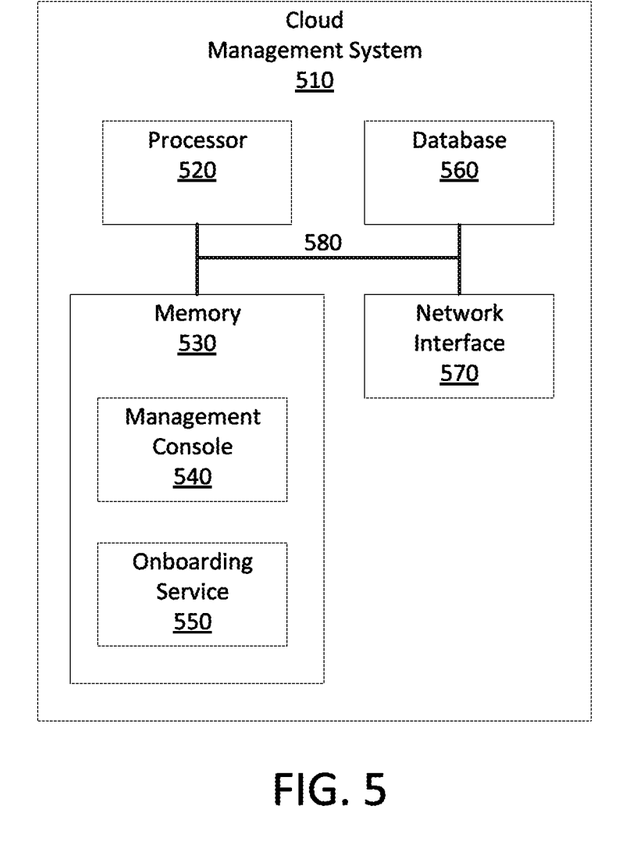
FIG. 5 illustrates components that may be included in a management system residing in the cloud or Internet that may provide information necessary to setup a wireless mesh network.

FIG. 5 illustrates components that may be included in a management system residing in the cloud or Internet that may provide information necessary to setup a wireless mesh network. The cloud management system 510 of FIG. 5 may implement functions consistent with the cloud management system 110 of FIG. 1 and may implement functions consistent with onboarding service 209 of FIG. 2. The cloud management system 510 of FIG. 5 includes processor 520 that may execute instructions out of memory 530. Memory 530 may also store program code associated with management console 540 operations or with functions associated with onboarding service 550. Management console program code 540 may allow processor 520 to receive and process information from a computer that sets network configurations or that sets network management rules. Program code of onboarding service 550 may allow information relating to a network configuration to be stored in database 560 that cross-references customer information with mesh node device identifying information, and with identifiers that identify computing devices that are authorized to communicate over a particular mesh network.

Cloud management system 510 of FIG. 5 may also include communication bus 580 that allows processor 520 to access data or instructions stored in memory 530 or in database 560. Instructions stored in database 560 may also include program code that may be executed at a mesh portal or mesh point that is consistent with methods and wireless mesh network configurations of the present disclosure. Management console program code 540 may also administrators to set policies or preferences relating to a particular mesh network. Management console 540 may also allow an administrator or user to identify, configure, and authorize new computing devices to access a particular mesh network. Note that processor 520 may also use communication bus 580 to send or receive data via communication interface 570. Network interface 570 may be either a communication interface that communicates with user devices using either wired or a wireless data communications. Here again, wired network communications maybe sent over an Ethernet compatible wired interface or these communications may be send over a cellular network.

Processor 520 may execute instructions out of memory 530 when operations consistent with management console 540 are performed, when information is stored in database 560, when operations consistent with onboarding service 550 are performed, or when communications are transmitted/received via network interface 570. Operations consistent with onboarding service 550 may include the same sorts of operations discussed in respect to onboarding service 209 of FIG. 2. For example, onboarding service 550 may use/receive login or device information over a secure channel (e.g. HTTPS), may use/provide unique session keys, and may perform device/mesh node registration & license checks consistent with operations associated with communications 218, 221, 257, 260, and 263 of FIG. 2.

Figure 6:
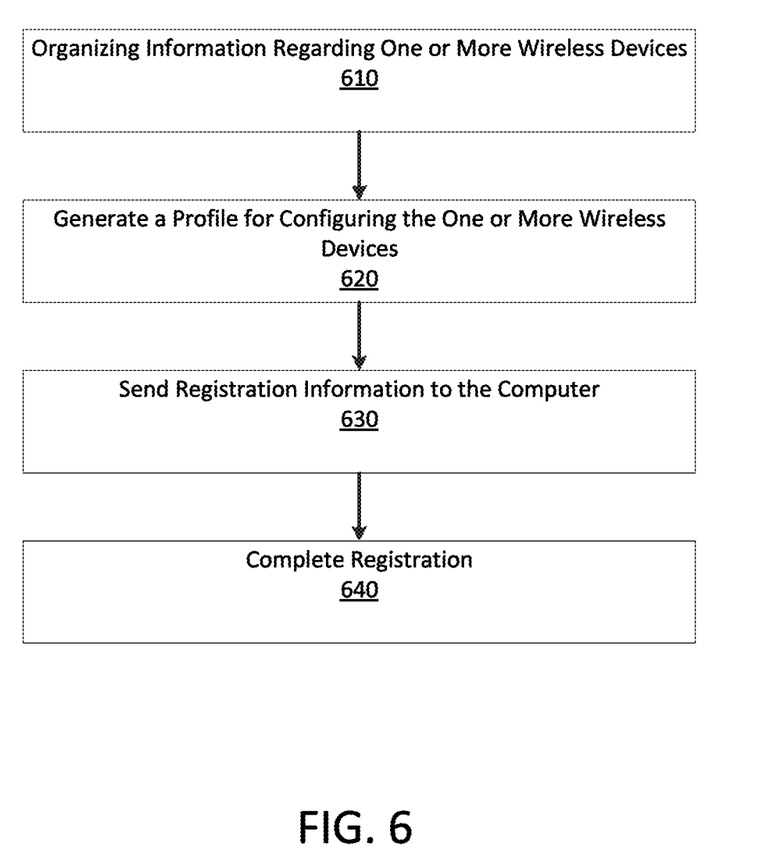
FIG. 6 illustrates exemplary steps that may be performed by a processor executing instructions out of a memory when user devices or mesh node devices are setup, provisioned, registered, or configured.

FIG. 6 illustrates exemplary steps that may be performed by a processor executing instructions out of a memory when user devices or mesh node devices are setup, provisioned, registered, or configured. FIG. 6 begins with step 610 where information regarding one or more wireless devices are organized at a user computing device that executes program code of the mobile APP 200 of FIG. 2. Some of the information organized in step 610 may have been received by a sensor, camera, or scanning device that scans or that takes an image of a label, a bar code, a quick response (QR) code, or a near field data communication (NFC) tag/chip associated with a wireless access point. For example a QR code on a box that the wireless access point was packaged or that is imprinted on the side of the wireless access point may be acquired by a camera. This received information may identify an identifier (e.g. a serial number, MAC identifier, or other number) that uniquely identifies the wireless access point and may also include an authorization code that enables the user computing device to communicate with the wireless access point. In certain instances, multiple different labels, bar codes, QR codes, or NFC tags may be scanned, where each of information received from each of those scans may identify different wireless access points that can be configured to be part of a new wireless mesh network.

The information organized in step 610 of FIG. 6 may be presented to a user or administrator that is preparing to register the one or more wireless devices as members of a wireless mesh network. In certain instances, information that identifies each respective wireless access point device of a plurality of wireless access point devices may be displayed in a display of the user computing device that executes the program code of the mobile APP 200, previously discussed. Alternatively or additionally the information organized in step 610 or a portion of that information may have been received at the user computing device in communications sent via low power communication signals from each of the one or more wireless access points.

The user/administrator may then provide inputs or settings that may be used to generate a profile for configuring the wireless devices into a wireless mesh network in step 620 of FIG. 6. This profile may have been generated from information entered via a user interface at the user computing device. The information entered by this user may include selections that select individual wireless access points that will be configured into a new wireless mesh network. For example, a user may select serial numbers of wireless devices in a user interface. The user may also provide inputs that identify: which of a set of wireless access points that will be assigned as a wireless mesh portal, which wireless access point that may be promoted to the position of a wireless mesh portal, a maximum hop count, a number of mesh points that may be assigned to a particular mesh portal, types of traffic that may be assigned to a particular 802.11 frequency band, or other information. After the user enters the information, that information may be used to generate a profile for configuring or provisioning any selected wireless access point according to the profile. This profile may have been generated by the user computing device executing program code associated with the mobile APP 200 of FIG. 2. This profile information may then be stored in a memory at the user computing device for later use and at least a portion of this profile information may be shared with the one or more wireless devices via the low power communication interface at the user computing device.

After the user computing device has generated the profile, registration information may be sent to a computer in the cloud in step 630 of FIG. 6 when the wireless mesh network is associated with a particular customer account. The registration information may include the generated profile, information that identifies each of the different wireless access points that are included in the new wireless mesh network, information that identifies which devices that should be configured as mesh portals or mesh points, and may include information that identifies the user computing device. Each of the wireless access points or the user computing device may be uniquely identified using any one of a machine identifier, a serial number, or other identifying information. The information sent to the cloud computer in step 630 may be sent via a secure communication session like the communication session setup in steps 212 and 215 of FIG. 2. Information sent to the cloud computer may have been encrypted using the temporary key generated by process 242 of FIG. 2. This information may have been encrypted using any form of encryption known in the art including, yet not limited to techniques according to the advanced encryption standard (AES encryption). The registration information sent in step 630 may have been sent after the mobile application program code at the user computing device matched machine integrity codes (MICs) generated by the one or more wireless access point devices with MICs generated by the user computing device. This matching of MICs may have been performed in a manner similar to the comparisons of a MIC and the re-computed MIC discussed in respect to FIG. 2. In certain instances, each respective wireless access point being configured to participate as members of a wireless mesh network may have been authenticated by matching a machine integrity code generated at a respective wireless access point with a respective machine integrity code generated by the user computing device. As such, each individual MIC generated at each respective access point may match a respective re-computed MIC generated at the user computing device. Each of these respective MICs may be different as each may have been generated using different information. As such, each individual wireless access point may have been separately authenticated via a MIC matching process.

After the registration information has been sent to the cloud computer, the cloud computer may review that information and a message may be received from the cloud computer in step 640 that indicates that the registration process of the devices in the new wireless mesh network has been completed. The cloud computer may store this registration information under a customer identifier and this information may be used by the cloud computer at a future time.

After the registration has been completed in step 640 of FIG. 6, the communications between the various different wireless mesh points or portals included in the new wireless mesh network may receive information from the wireless mesh network through a new secure communication session. At this point in time the cloud computer may provide software updates for installation at one or more of the wireless mesh points or mesh portals that were registered in step 630 of FIG. 6. As such, the cloud computer could identify updates that should be provided to each of the different devices included in the new wireless mesh network. After step 640, the flow chart of FIG. 6 may end.

After the new mesh network has been registered and configured, each of the mesh points or mesh portals may send communications using the 802.11 protocol according to the profile generated in step 620 of FIG. 6. Here again, any mesh portals included in the new mesh network may communicate with user devices or with mesh devices via 802.11 compatible communications and these mesh portals may communicate with other devices using wired or wireless communication interfaces.

At a later point in time when there is a need to expand the wireless mesh network to include more wireless mesh points or mesh portals, the user computing device may once again scan a label, bar code, QR code, or NFC code associated with a new wireless access point. At this point in time, the user computing device may communicate with the new wireless access point using the low power communication interface and the user computing device may share the previously stored configuration information with the new wireless access point as that wireless access point is prepped to join the wireless mesh network registered in step 630 of FIG. 6. The user computing device may then send updated registration information to the cloud computer to update the set of mesh devices that are associated with the mesh network configured in FIG. 6.

Figure 7:
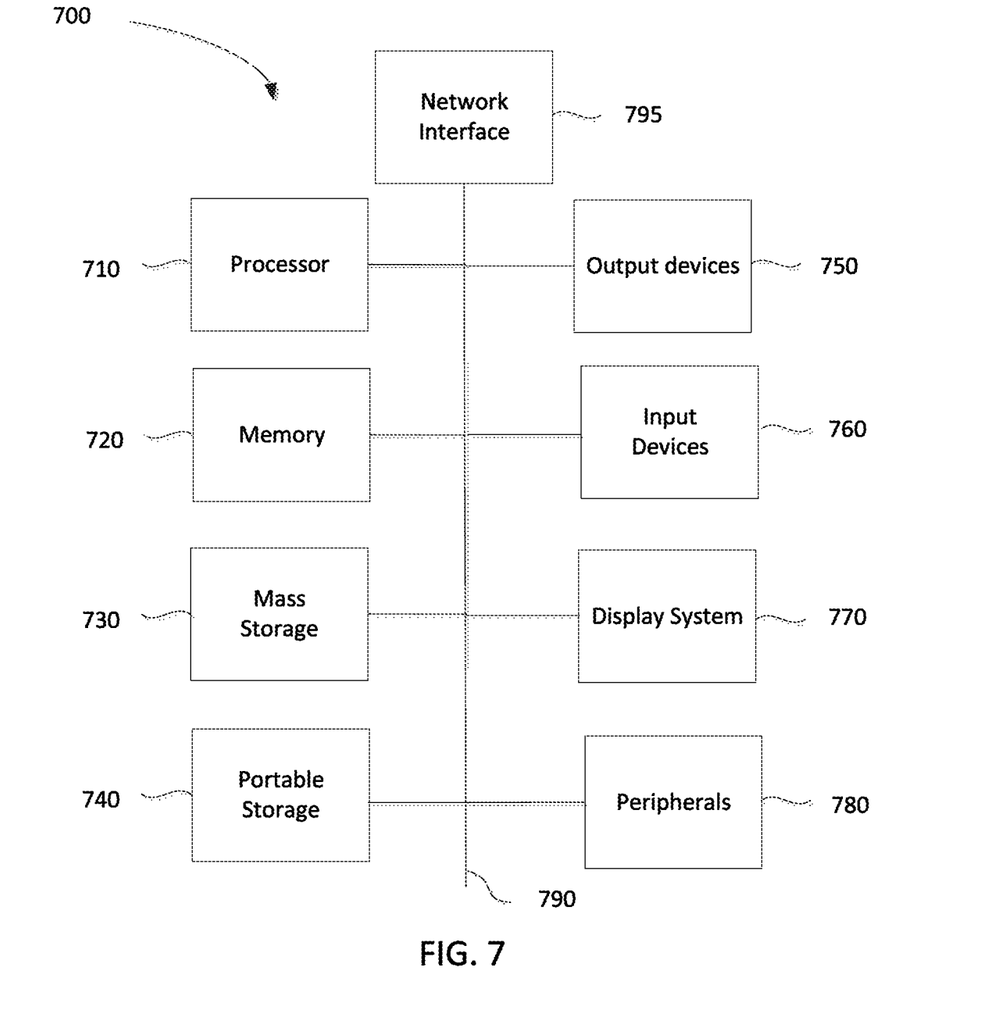
FIG. 7 illustrates a computing system that may be used to implement an embodiment of the present invention.

FIG. 7 illustrates a computing system that may be used to implement an embodiment of the present invention. The computing system 700 of FIG. 7 includes one or more processors 710 and main memory 720. Main memory 720 stores, in part, instructions and data for execution by processor 710. Main memory 720 can store the executable code when in operation. The system 700 of FIG. 7 further includes a mass storage device 730, portable storage medium drive(s) 740, output devices 750, user input devices 760, a graphics display 770, peripheral devices 780, and network interface 795.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a FLASH memory, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD), a plasma display, an organic light-emitting diode (OLED) display, an electronic ink display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a router. Network interface 795 may include any form of computer interface of a computer, whether that be a wired network or a wireless interface. As such, network interface 795 may be an Ethernet network interface, a BlueTooth™ wireless interface, an 802.11 interface, or a cellular phone interface. Computing system 700 may include multiple different types of network interfaces, for example, computing system 700 may include one or more of an Ethernet network interface, a BlueTooth™ wireless interface, an 802.11 interface, or a cellular phone interface.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 700 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, any other magnetic medium, any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for configuring wireless mesh devices, the method comprising:
   receiving a communication from a user device via a first type of communication channel at a wireless mesh device, wherein the communication includes a first set of information;
   generating an initial pairwise key from the first set of information and from a second set of information at the wireless mesh device;
   sending a message to the user device that includes the second set of information from the wireless mesh device so that the user device can generate a corresponding pairwise key after extracting the second set of information from the message, validate the initial pairwise key, and send a login message to the wireless mesh device;
   verifying the login message received from the user device, the login message generated after validation of the corresponding pairwise key with respect to the initial pairwise key; and
   sending an access granted message to the user device based on verifying the login message, wherein the wireless mesh device is deemed a registered wireless mesh device and is configured following the sending of the access granted message and a subsequent dual factor communication with a registration computer.

2. The method of claim 1, further comprising generating the second set of information at the wireless mesh device that includes a second random number, wherein the first set of information includes a first random number generated at the user device.

3. The method of claim 2, further comprising:
   identifying that the first set of information includes the first random number;
   identifying that the initial pairwise key should be generated based on receipt of the first set of information, wherein the initial pairwise key is generated at the wireless mesh device from the first random number and the second random number; and
   generating the second set of information inclusive of a first code, wherein the user device identifies that a second code generated at the user device matches the first code and sends a login message based on the first code matching the second code.

4. The method of claim 1, further comprising:
receiving registration information via the first type of communication channel; and
sending the registration information to the registration computer via a second type of communication channel.

5. The method of claim 4, further comprising:
receiving a registration complete message from the registration computer via the second type of communication channel; and
sending the registration complete message to the user device via the first type of communication channel.

6. The method of claim 1, further comprising preparing communications to send to the user device via the first type of communication channel by a first processor executing instructions at the wireless mesh device, wherein the login message is validated by a second processor executing instructions at the wireless mesh device.

7. The method of claim 1, wherein the user device sends registration information to the registration computer via the second type of communication channel.

8. A system for configuring a wireless mesh device, the system comprising:
an application program that includes instructions executable by a processor of a user device, wherein the user device sends a communication that includes a first set of information via a first type of communication channel;
a wireless mesh device that receives the communication from the user device via the first type of communication channel, the wireless mesh device performing functions of:
generating an initial pairwise key from the first set of information and from a second set of information at the wireless mesh device,
sending a message to the user device that includes the second set of information so that the user device can generate a corresponding pairwise key after extracting the second set of information from the message, validate the initial pairwise key, and send a login message to the wireless mesh device,
verifying the login message received from the user device, the login message generated after validation of the corresponding pairwise key with respect to the initial pairwise key, and
sending an access granted message to the user device based on verifying the login message; and
a registration computer that receives registration information sent from the user device, wherein the registration computer receives the registration information via a second type of communication interface, and the wireless mesh device is deemed a registered wireless mesh device and is configured following the sending of the access granted message and a subsequent dual factor communication with the registration computer.

9. The system of claim 8, wherein the first type of communication channel is capable of sending and receiving signals consistent with a Bluetooth communication interface.

10. The system of claim 9, wherein the second type of communication channel is capable of sending and receiving signals consistent with a cellular phone interface.

11. The system of claim 8, wherein the wireless mesh device:
receives the registration information from the user device via the first type of communication channel, and
sends the registration information to the registration computer via a second type of communication channel.

12. The system of claim 11, wherein the wireless mesh device sends the registration information to the registration computer via a firewall that forwards the registration information to the registration computer.

13. The system of claim 8, wherein the wireless mesh device includes:
a first memory;
a first processor that executes instructions out of the first memory to perform a first set of functions at the wireless mesh device;
a second memory; and
a second processor that executes instruction out of the second memory to perform a second set of functions at the wireless mesh device.

14. The system of claim 13, further comprising a second type of communications channel that performs the second set of functions inclusive of preparing communications to send via the second type of communication channel to the registration computer, wherein the first set of functions includes preparing messages to send via the first type of communication channel.

15. A non-transitory computer-readable storage medium having embodied thereon one or more sets of instructions executable by a processor for implementing a method for configuring wireless mesh devices, the method comprising:
receiving a communication from a user device via a first type of communication channel at a wireless mesh device, wherein the communication includes a first set of information;
generating an initial pairwise key from the first set of information and from a second set of information at the wireless mesh device;
sending a message to the user device that includes the second set of information from the wireless mesh device so that the user device can generate a corresponding pairwise key after extracting the second set of information from the message, validate the initial pairwise key, and send a login message to the wireless mesh device;
verifying the login message received from the user device, the login message generated after validation of the corresponding pairwise key with respect to the initial pairwise key; and
sending an access granted message to the user device based on verifying the login message, wherein the wireless mesh device is deemed a registered wireless mesh device and is configured following the sending of the access granted message and a subsequent dual factor communication with a registration computer.

16. The non-transitory computer-readable storage medium of claim 15, the one or more sets of instructions further executable to:
generate the second set of information at the wireless mesh device that includes a second random number, wherein the first set of information includes a first random number generated at the user device.

17. The non-transitory computer-readable storage medium of claim 16, the one or more sets of instructions further executable to:
identify that the first set of information includes the first random number;
identify that the initial pairwise key should be generated based on receipt of the first set of information, wherein the initial pairwise key is generated at the wireless mesh device from the first random number and the second random number; and generate the second set of information inclusive of a first code, wherein the user device identifies that a second code generated at the user device matches the first code and sends a login message based on the first code matching the second code.

18. The non-transitory computer-readable storage medium of claim 15, the one or more sets of instructions further executable to:
receive registration information via the first type of communication channel; and
send the registration information to the registration computer via the second type of communication channel.

19. The non-transitory computer-readable storage medium of claim 18, the one or more sets of instructions further executable to:
receive a registration complete message from the registration computer via the second type of communication channel; and
send the registration complete message to the user device via the first type of communication channel.

20. The non-transitory computer-readable storage medium of claim 15, wherein the one or more sets of instructions includes:
a first set of instructions executed by a first processor to prepare communications to send to the user device via the first type of communication channel, and
a second set of instructions executed by a second processor executing instructions to validate the login message.

* * * * *